(No Model.)

F. H. HAMBLETON.
PIPE COUPLING.

No. 467,718. Patented Jan. 26, 1892.

WITNESSES
Dan'l Fisher
Geo. E. Taylor

INVENTOR
Francis H. Hambleton,
by W. T. Howard,
atty.

UNITED STATES PATENT OFFICE.

FRANCIS H. HAMBLETON, OF BALTIMORE, MARYLAND.

PIPE-COUPLING.

SPECIFICATION forming part of Letters Patent No. 467,718, dated January 26, 1892.

Application filed March 7, 1891. Serial No. 384,139. (No model.)

*To all whom it may concern:*

Be it known that I, FRANCIS H. HAMBLETON, of Baltimore, Maryland, have invented certain Improvements in Pipe-Couplings, of which the following is a specification.

This invention relates to certain improvements in the construction of that class of pipe-coupling devices commonly known as "long screws," as will hereinafter fully appear.

In the description of the said invention which follows, reference is made to the accompanying drawings, forming a part hereof, in which—

Figure 1:
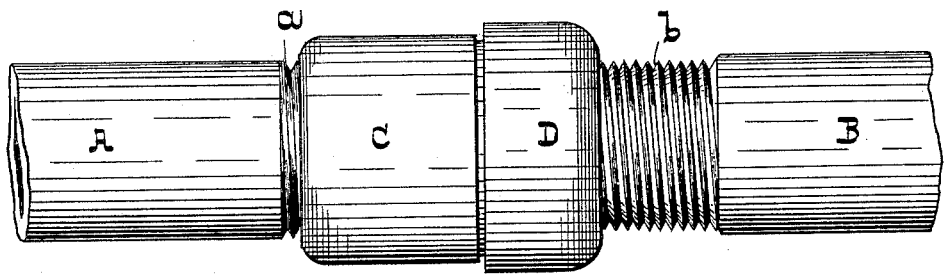
Figure 2:
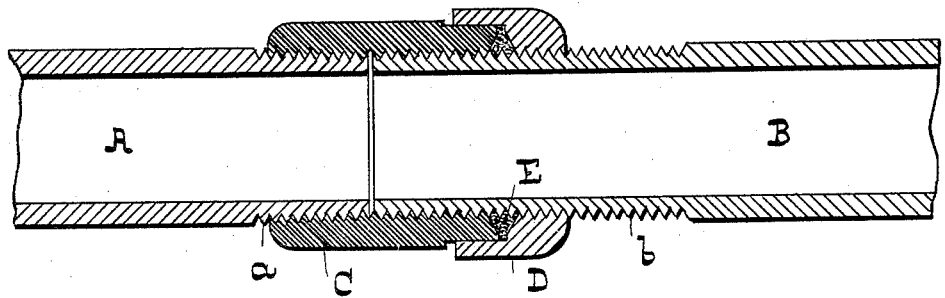

Figure 1 is an exterior view of two pipes coupled by means of the present invention, and Fig. 2 a longitudinal section of the same.

Referring to the said drawings, A and B are the pipes to be coupled. The pipe A is provided with a short thread $a$, which has the usual taper, and the pipe B with a long thread $b$, of a uniform diameter, which corresponds practically with that at the extreme end of the other.

C is a sleeve adapted to turn loosely on the thread $b$, but to fit tightly on the thread $a$ of the pipe A.

D is a threaded gland, fitted to turn loosely on the thread of the pipe B, having a lip or flange $c$, which passes over the end of the sleeve C, which is turned smooth to receive it.

E is a body of packing material placed between the approaching ends of the sleeve and gland to prevent leakage from around the thread $b$. In connecting the pipes the sleeve and gland are screwed back on the thread $b$, so as to expose the end of the pipe B, and the pipes are then brought together, or nearly so. The sleeve C is then screwed forward over the end of the pipe B and onto the tapering thread $a$ of the pipe A, and after a tight connection between the said sleeve and the pipe A is effected the packing material E is applied and the gland D is set up until the packing is sufficiently compressed and the lip $c$ passes over the end of the sleeve. When this is accomplished, water, steam, or air in the pipes may leak around the thread $b$; but its final escape is prevented by the packing E, which cannot be displaced, owing to the lip $c$ being over the end of the coupling-sleeve.

I claim as my invention—

A pipe having at its end a tapered thread, a pipe of similar size having at its end a thread uniform throughout its length and of a diameter corresponding practically with that of the smaller part or end of the tapered thread, a sleeve interiorly threaded to fit any portion of the thread, of uniform diameter, but which is smaller than the larger part or base of the tapered thread, a gland interiorly threaded in like manner to the sleeve, provided with a lip adapted to pass over the end of the sleeve, and a packing situated between the adjoining faces of the gland and sleeve with its circumference covered by the lip of the said gland, substantially as and for the purpose specified.

FRANCIS H. HAMBLETON.

Witnesses:
EDMUND H. NOEL,
E. W. VON CULIN.